(12) United States Patent
Kolpekwar

(10) Patent No.: US 12,494,037 B2
(45) Date of Patent: Dec. 9, 2025

(54) PROCESS FOR PROVIDING ACCURATE COUNTING OF NUCLEI IN CELLULAR IMAGES

(71) Applicant: Rishik Kolpekwar, Round Rock, TX (US)

(72) Inventor: Rishik Kolpekwar, Round Rock, TX (US)

( * ) Notice: Subject to any disclaimer, the term of this patent is extended or adjusted under 35 U.S.C. 154(b) by 335 days.

(21) Appl. No.: 18/368,348

(22) Filed: Sep. 14, 2023

(65) Prior Publication Data

US 2024/0177447 A1    May 30, 2024

(51) Int. Cl.
*G06V 10/56*    (2022.01)
*G06V 20/69*    (2022.01)

(52) U.S. Cl.
CPC ............ *G06V 10/56* (2022.01); *G06V 20/693* (2022.01); *G06T 2207/20081* (2013.01)

(58) Field of Classification Search
None
See application file for complete search history.

(56) References Cited

U.S. PATENT DOCUMENTS

2013/0290225 A1* 10/2013 Kamath ................. G06V 20/69
706/12
2018/0336682 A1* 11/2018 Chukka ................ G06V 20/695

OTHER PUBLICATIONS

Barricelli et al., "ki67 nuclei detection and ki67-index estimation: a novel automatic approach based on human vision modeling", DOI: https://doi.org/10.1186/s12859-019-3285-4 (Year: 2019).*

* cited by examiner

*Primary Examiner* — Chan S Park
*Assistant Examiner* — Promotto Tajrian Islam
(74) *Attorney, Agent, or Firm* — Outlier Patent Attorneys, PLLC

(57) ABSTRACT

This invention accomplishes an improvement to nuclei counting through an automatic counting algorithm that labels the nuclei in the images for the reviewers similar to how an individual would analyze cancerous and non-cancerous nuclei. The invention then provides a manual review step to reanalyze the image through a semi-automatic user interface. In addition, the counting data is stored in image metadata and a condensed version of the modified images is created.

19 Claims, 7 Drawing Sheets

PROCESS FOR PROVIDING ACCURATE COUNTING OF NUCLEI IN CELLULAR IMAGES

CROSS-REFERENCE TO RELATED APPLICATIONS

None.

BACKGROUND

Field of Art

This invention is related to an image processing system. More specifically, this invention is related to diagnosis of cancerous nuclei for a given human cellular image or a set of images. The invention takes in one or more human cellular images and identifies cancerous and non-cancerous nuclei in those images. It keeps track of these nuclei counts and finally publishes the overall statistics. These statistics help towards diagnosis of cancer in patients.

Background

When analyzing images of cells for medical purposes, professionals require accurate numbers of both cancerous and non-cancerous nuclei. By comparing the numbers present and performing a statistical analysis, meaningful diagnosis and treatment plans can be created for patients. Most current approaches rely on manual counting (i.e. eyeballing an image) of the cancerous nuclei. This is a very crude method highly subjected to human error and a great deal of time. This additional human error is only countered by users spending more time counting or recounting the nuclei in the image.

These counts produced by professionals sometimes need to be reviewed. When reviewing the counts of nuclei produced by professionals, a user can only recount the nuclei in the image. If the second count produces a different number of healthy and unhealthy nuclei, there is no way for a user to know which count is correct because there is no way to know which nuclei either user may have miscounted.

This lack of clarity causes problems and current methods may end up marking up an image manually. This has a potential of making the initial image unclear and if a mistake is made by the reviewer, there is no clear way of changing the count. Afterwards, the images may be rendered difficult to review from the various markings on them.

SUMMARY

The following invention overcomes these shortcomings found in the art through an improved ability to analyze the images while still retaining the audit history of the various counts in the images. It accomplishes this through an automatic counting algorithm that labels the nuclei in the images for the reviewers similar to how an individual would analyze cancerous and non-cancerous nuclei. However, different from traditional methods, the invention then provides a manual review step to reanalyze the image through a semi-automatic user interface. In addition, the counting data is stored in image metadata, a step not currently provided by present solutions. Lastly, a compiled version of the modified images is created by the invention.

This invention's automatic counting algorithm is able to accurately count cells by comparing cellular images to a set of known identifier colors. In addition, the invention is able to ensure that counts are accurate by denoting an area of interest on the image with a colored dot which labels each individual nuclei as either cancerous or non-cancerous. This image is then provided to a reviewer and the various coordinates of the labeled nuclei are stored on the image's metadata to help ensure accuracy and an improved ability to audit and review.

Any deficiencies in the automatic counting algorithm are overcome with a review option for users. This review allows a user to select the labels and remove them or alternatively, the user can add new labels to nuclei the automatic labeler missed. This helps a user know which nuclei in the image were counted correctly and which ones were counted incorrectly. This further helps improve the accuracy of the count and the statistics produced.

Current mechanisms in the art do not store information on how each nucleus got classified by the reviewer. This invention allows for multiple users to review the same images, arrive at a final conclusion, and compile a final report by combining multiple images. Such a final report is important for bookkeeping and tracking purposes.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

FIG. 1 illustrates a system for identifying cancerous nuclei in accordance with an exemplary embodiment of the invention FIG. 2 illustrates the processor system diagram for identifying cancerous nuclei in accordance with an exemplary embodiment of the invention FIG. 3 illustrates the method for identifying cancerous nuclei in accordance with an exemplary embodiment of the invention FIG. 4 illustrates one embodiment of the computing architecture that supports an embodiment of the inventive disclosure.

DETAILED DESCRIPTION OF EMBODIMENTS

Figure 1:
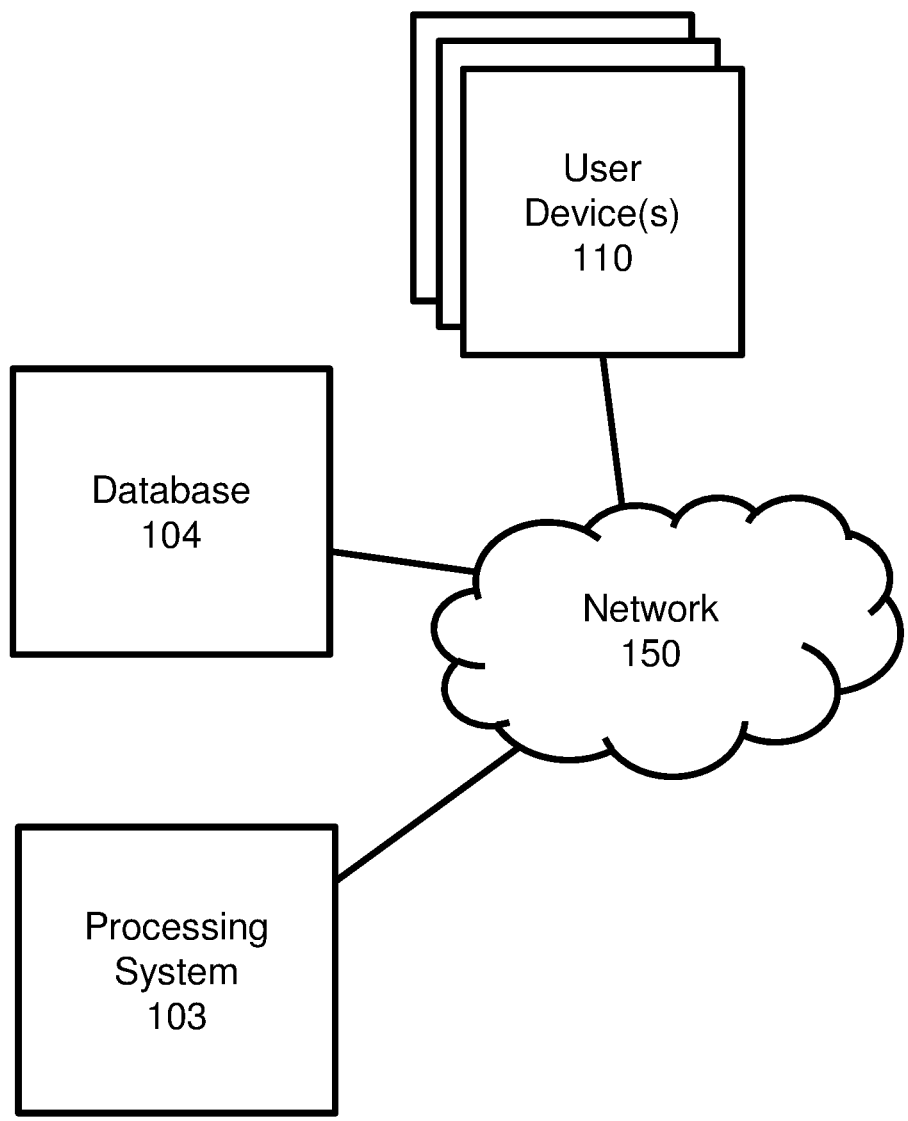

This invention accomplishes an improvement to nuclei counting through an automatic counting algorithm that labels the nuclei in the images for the reviewers similar to how an individual would analyze cancerous and non-cancerous nuclei. However, different from traditional methods, the invention then provides a manual review step to reanalyze the image through a semi-automatic user interface. In addition, the counting data is stored in image metadata, a step not currently provided by present solutions. Lastly, a condensed version of the modified images is created for users.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

FIG. 1 illustrates a system for diagnosis of cancerous nuclei in human image files. The system comprises a processing system 103 connected over a network 150 to a database 104 and a user device 110. Alternatively, the processing system 103 and the database 104 can be deployed on the user device 110.

The processing system 103 comprises a computing device that comprises, but is not limited to a computer or microprocessor. The processing system 103 is able to obtain and analyze image files through a series of steps and produce a final report and set of image files. This processing system is typically provided on the user device 110, but alternatively, can be provided over an electronic network 150 for remote use by a user. This method would allow users to analyze images without having to have the processing system 103 stored on the user device 110.

The database 104 is optionally connected to the processing system 103 and the user device 110 over an electronic network 150. This database 104 can be used to store image files, color definition data, statistical data, and final reports for users to access at any time. In one embodiment, this data is encrypted. Alternatively, the database 104 could not be connected electronically and all the data may be stored on the user device 110. In another embodiment, the database could only store statistical data and not the related images.

User device(s) 110 include, generally, a computer or computing device including functionality for communicating (e.g., remotely) over a network 150. Data may be collected from user devices 110, and data requests may be initiated from each user device 110. User device(s) 110 may be a server, a desktop computer, a laptop computer, personal digital assistant (PDA), an in- or out-of-car navigation system, a smart phone or other cellular or mobile phone, or mobile gaming device, among other suitable computing devices. User devices 110 may execute one or more applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 110 may be an electronic device including hardware, software, or embedded logic components or a combination of two or more such components and capable of carrying out the appropriate functions implemented or supported by the user device 110. For example and without limitation, a user device 110 may be a desktop computer system, a notebook computer system, a netbook computer system, a handheld electronic device, or a mobile telephone. The present disclosure contemplates any user device 110. A user device 110 may enable a network user at the user device 110 to access network 150. A user device 110 may enable its user to communicate with other users at other user devices 110.

A user device 110 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 110 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 110 one or more Hyper Text Markup Language (HTML) files responsive to the HTTP request. The user device 110 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110 may also include an application that is loaded onto the user device 110. The application obtains data from the network 150 and displays it to the user within the application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include Other user devices capable of accessing the same image sets as a first user and capable of editing the images simultaneously. In addition, the data stored on the database can be encrypted and used to train AI on nuclei identification processes. Also, statistical data can be stored on the database, without access to the underlying images. Other databases and systems may be added or subtracted, as would be readily understood by a person of ordinary skill in the art, without departing from the scope of the invention.

Figure 2:
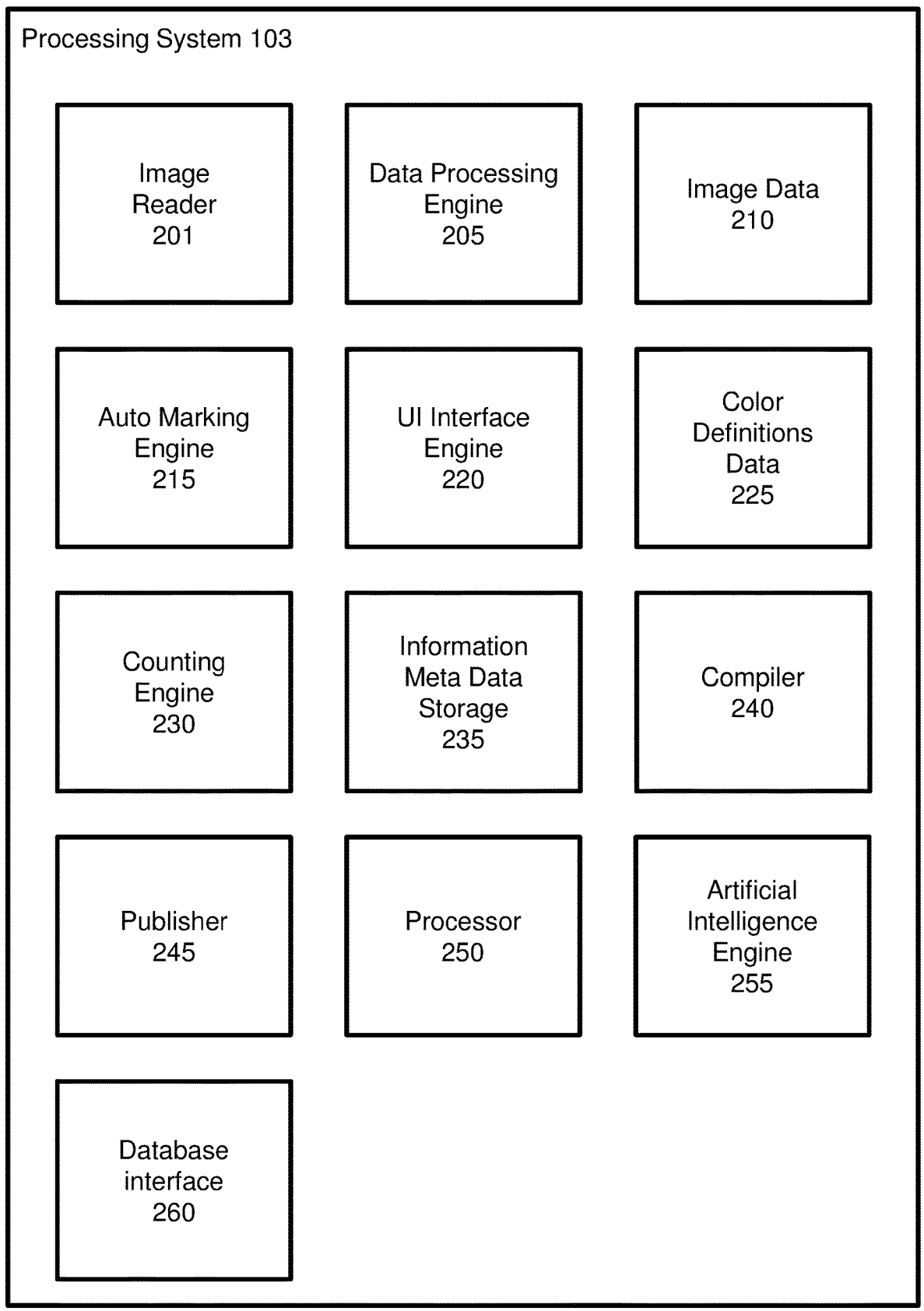

FIG. 2 illustrates an example computing environment in accordance with an exemplary embodiment of the present invention. The computing environment may comprise an image reader 201, a data processing engine 205, a set of image data 210, an auto marking engine 215, a UI interface engine 220, a set of color definitions data 225, a counting engine 230, an information metadata storage 235, a compiler 240, a publisher 245, a processor 250, Artificial intelligence engine 255, Database Interface 260.

The Image reader 201 allows the processing system 103 to read data from image files provided by the user. This reader 201 is capable of reading, in an exemplary embodiment of the invention, JPEG files, but is also capable of reading at least, but not limited to PNG, PDF, TIFF, PSD, RAW files. Alternatively, the image reader may be connected directly to an imaging system, like a microscope, and is able to read in raw data.

Data Processing Engine 205 allows the processing system 103 to interpret the data it generates in the analysis of the image data 210. The data processing engine 205 is capable of performing statistical analysis on generated lists of cancerous and non-cancerous nuclei.

Image data 210 is optionally contained on the processing system 103. If this data is not stored on the processing system, it may also be stored on the database 104. This data in an exemplary embodiment of the invention is JPEG data files, but is also alternatively at least, but not limited to PNG, PDF, TIFF, PSD, RAW files. The image data 210 contains images of cells captured by microscopes or other cameras capable of magnification and the cells and nuclei have been stained by methods known in the art. In an embodiment of the invention, the nuclei are stained blue and brown. Alternatively, the image data can contain other cellular images that can be analyzed for color differences.

Auto Marking Engine 215 allows the processing system 103 to add positive and negative indicators to the images and store the positive and negative markings by storing the (X,Y) coordinates and status of the marks. These stored coordinates can then be translated, in one embodiment, into colored circles for indicating cancerous and non-cancerous nuclei. In an exemplary embodiment of the invention, the auto marking engine 215 creates coordinates as strings and stores as metadata in the image. The (X,Y) coordinates are auto-generated as the center of the shapes. The marked images are stored as a new image file without overwriting the original image. Alternatively, the new images could overwrite the original images.

UI Interface Engine 220 allows the processing system 103 to receive user input in order to modify the new images. The UI interface engine 220 prompts the user to choose to mark up the modified image through a series of selectable elements. The user marking ability is referred to as a semi automatic marking as much of the selections and identification is accomplished by the processing system 103. The user is able to select a pixel on the image and if it is an unmarked nuclei, a marking is applied to the image with the color analysis of the cancerous/non-cancerous nuclei determined automatically. This step additionally modifies the list of coordinates associated with the image. Alternatively, if the user selects a marked pixel, the marking is removed and the list of coordinates is modified. In addition, the UI interface engine could mark up images without a previous step of automatically marking. Alternatively, a user could select a "positive" mode where only positive markings would be applied to the image or a "negative" mode where only negative markings would be applied to the image when a selection is made. Both "positive" and "negative" modes would allow for the automatic unmarking of the image.

Color Definitions Data 225 allows the processing system 103 to recognize which colors are associated with various statuses of the stained cells. A range of colors is provided that is associated with nuclei that are cancerous and a separate range of colors is provided that is associated with nuclei that are non-cancerous. In an exemplary embodiment of the invention, the non-cancerous nuclei are blue in color and the cancerous nuclei are brown in color. Alternatives could include other color ranges that result from various staining methods known in the art. Furthermore, the predefined list of colors could be provided on the database 104 which is connected over an electronic network. 150 Also the color definitions could be user provided by presenting the image to the user and prompting the user to identify at least one nuclei that is cancerous and at least one nuclei that is non-cancerous. The algorithm would then associate at least the user identified colors with cancerous and non-cancerous nuclei. In addition the algorithm could also expand the range of colors to ones that are also similar to the user defined colors. These colors would then provide the predefined list of colors to identify the nuclei. In another embodiment, the color definitions would be provided through an artificial intelligence analysis of a training set of images.

Counting Engine 230 allows the processing system 103 to count the number of cancerous and non-cancerous nuclei as both the auto marking engine 215 and the UI interface 220 generate markings for the nuclei. As cancerous nuclei are identified or unidentified, a count of cancerous nuclei is increased or decreased. Similarly, as non-cancerous nuclei are identified or unidentified, a count of non-cancerous nuclei is increased or decreased.

Information MetaData Storage 235 allows the processing system 103 to store the coordinates of cancerous and non-cancerous nuclei with the image that it counted. In addition the counts produced by the counting engine are also stored in the image metadata. This metadata storage is accomplished with internal storage, however alternatives can store the information externally or in a sidecar file.

Compiler 240 allows the processing system 103 to aggregate all the various data into a single file for export by the publisher 245. The compiler is able to gather all the modified image files and combine them into a single file. In addition, the compiler is able to combine the statistics comparing the cancerous and non-cancerous nuclei counts and display at least the percentage of cancerous nuclei to the total number of nuclei.

Publisher 245 allows the processing system 103 to publish the final report to a user. This report is generated, in an embodiment of the invention, as a single portable document format (PDF) file. This file can be automatically opened for the user after it is generated or saved onto a new file. This file can easily be audited by a user and creates a clear trail to follow. Alternatively, other document types can be generated for the report as known in the art.

Processor 250 allows the processing system 103 to execute the various steps required to analyze the images and produce a final report. The processor 250 is capable of performing statistical analysis on the counts provided by the counting engine 230.

Artificial intelligence engine 255 is used as another source for the color definitions data 225. The artificial intelligence engine 255 is trained on images stored from previous analysis. This training is accomplished through machine learning techniques such as a linear regression, a logistic regression, a decision tree, a SVM algorithm, a Naive Bayes algorithm, a KNN algorithm, a K-means, a Random forest algorithm, a dimensionality reduction algorithms, or a gradient boosting algorithm and AdaBoosting algorithm.

Database Interface 260 is used to connect the processing system 103 to the database 104. This connection is used to obtain color definitions data which may be stored on the database 104. Furthermore, the database interface 260 can be used to obtain images from the database 104. In addition, the interface may be capable of encrypting and decrypting the data stored on the database 104.

Figure 3:
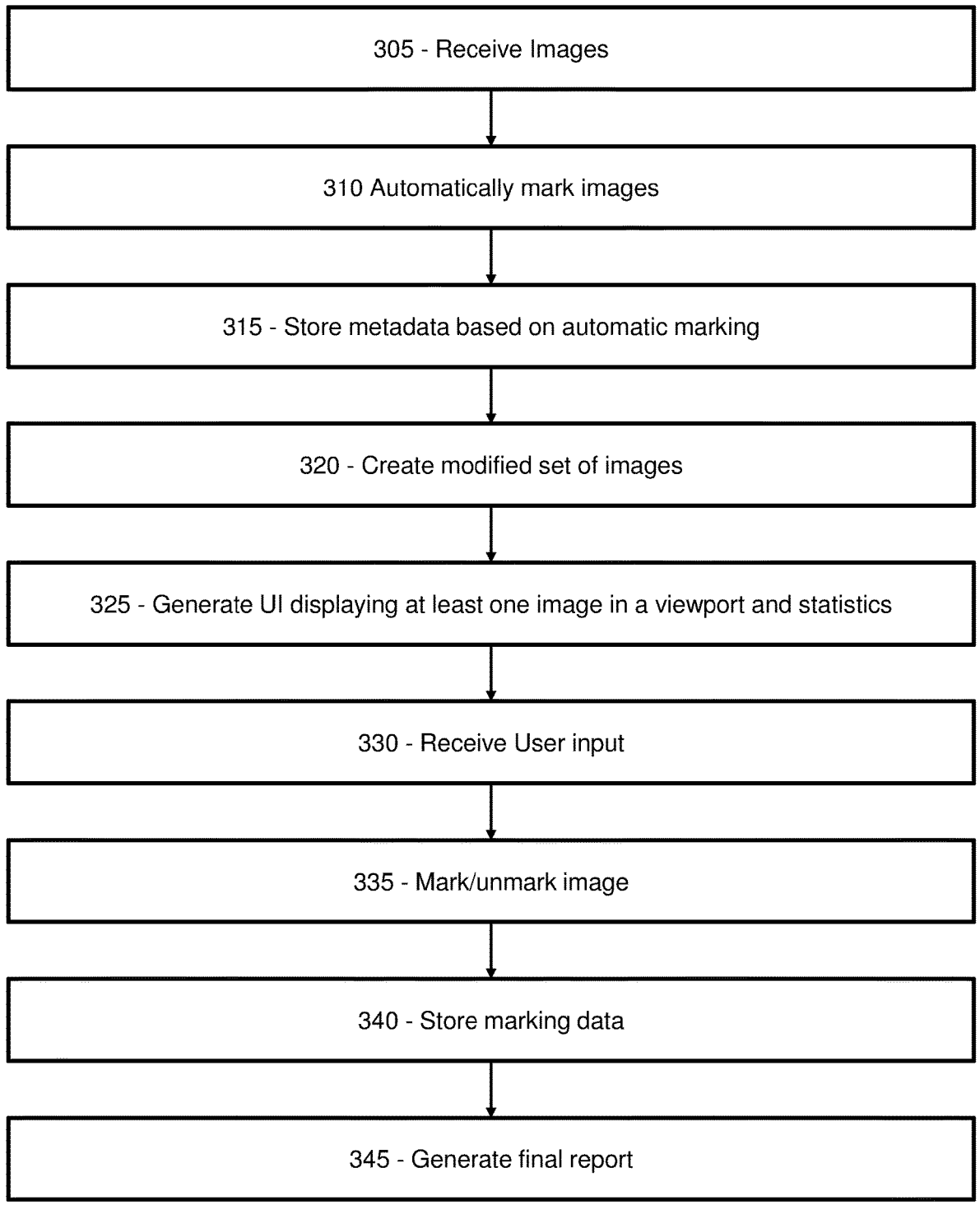

FIG. 3 illustrates an exemplary process for image processing and cell nuclei identification comprising the steps of receiving Images 305, automatically mark images 310, store metadata based on automatic marking 315, create modified set of images 320, generate UI displaying at least one image in a viewport and statistics 325, receive user input 330, mark/unmark image 335, store marking data 340, and generate final report 345

Receive Images 305 per instructions above involves a user uploading at least one image data set which consists of at least one image. These image data sets are of cellular images that have been stained to indicate at least which nuclei are cancerous and which ones are non-cancerous. Each state of the nuclei is denoted by a different color. These images can alternatively be accessed on an online database.

Automatically mark images 310 is accomplished by applying an algorithm that looks at the image data set and compares the image pixels to at least one set of color ranges. In an embodiment of the invention the automatic marking step 310 comprises reading the color of a first pixel at a set of coordinates. Also, the color is matched with the predefined list of colors that are identified as positive or negative nuclei. If there is a positive or negative color match, the next step is to identify a square with a size of 8 (i.e. 8 pixels) with the first pixel as a center. The size of or shape of this square can change if the pixel is too close to the image boundary. Next a scan is made through each of the pixels within the square, and for each pixel, the color match is performed to identify positive or the negative nuclei. If there is a color match, the pixel is checked to see if it lies within the circle of radius 4 pixels centered on the first pixel. In an embodiment of the current invention, this step is done by checking the circle equation: $(x_i-x_c)2+(y_i-y_c)2<16$ If both checks are successful, the first pixel is colored as Red (for positive nucleus) and Green (for negative nucleus). Next, the positive or negative nuclei counts are increased accordingly. The coordinates of the first pixel are stored in the list of positive or negative nuclei. The marking is then continued throughout the rest of the image until the entire image has been searched. The process is then repeated for the rest of the images in an image data set. Alternatively, the predefined list of colors could be provided on a database which is connected over an electronic network. Also the color definitions could be user provided. This step of gathering user-provided color definitions would comprise the step of presenting the image to the user and prompting the user to identify at least one nuclei that is cancerous and at least one nuclei that is non-cancerous. The algorithm would then associate at least the user identified colors with cancerous and non-cancerous nuclei. In addition the algorithm could also expand the range of colors to ones that are also similar to the user defined colors. These colors would then provide the predefined list of colors to identify the nuclei.

Store metadata based on automatic marking 315 is accomplished through adding the list of coordinates and the counts of the cancerous and non-cancerous nuclei into the metadata of the newly marked images. Alternatively, this data can be stored in a sidecar file or externally.

The step of creating a modified set of images 320 is accomplished by generating a new set of images that contain the metadata and have the markings superimposed on the initial images. This modified set of images are separate from the originals. Alternatively, the new images could overwrite the originals.

Generate UI displaying at least one image in a viewport and statistics 325 presents an image that is a subset of the modified set of images. This subset image displays all the markings generated by the automatic marking step 310. In addition but not limited to, a set of statistics showing the total number of cancerous and non-cancerous nuclei are displayed in addition to the percentage of nuclei that are cancerous. This step can be repeated for each image in the data set.

Receiving user input 330 allows a user to click upon the image in order to modify the markings and the counts of cancerous and non-cancerous nuclei. In an embodiment of the current invention, the first step comprises receiving the pixel coordinates of the mouse click. Next the color of the pixel at $(x_c,y_c)$ is read. The color is matched with the predefined list of colors that are identified as positive or negative nuclei. If there is a positive or negative color match. Next the system identifies a square with size 8 pixels with $(x_c,y_c)$ as a center. The size of or shape of this square can change if $(x_c,y_c)$ is too close to the image boundary. A scan is made through each of the pixels within the square. For each pixel in the scan, a color match is performed to identify positive or the negative nuclei. If there is a color match, the system will check if the pixel lies within the circle of radius 4 pixels.

Mark/unmark image 335 is accomplished after the steps above and comprises confirming that both checks are successful, then color the pixel as Red (for positive nucleus) and Green (for negative nucleus). Then the counter for the positive or negative nuclei is increased accordingly. $(x_c,y_c)$ is then stored in the list of positive or negative clicks in the metadata of the image as determined through the previous scan. The positive or negative counts are then updated as applicable. If the pixel color matches that of a previously identified and marked nuclei, then the nucleus needs to be unmarked. If it is positive, then load up the metadata in the image and look through the Positive Clicks to locate the nearest coordinate in the "Positive Clicks" list. In an embodiment of the invention, the "nearest coordinate" is located using the linear distance formula. (square root of $((x_p-x_i)^2+(y_p-y_i)^2)$ where $(x_i, y_i)$ are the entries in the positive clicks list. If the color of the selected coordinate is negative, repeat the steps for finding the nearest coordinate above. Alternatively, a user could select "positive" mode where only positive markings would be applied to the image or "negative" mode where only negative markings would be applied to the image when a selection is made. Both "positive" and "negative" modes would optionally allow for the automatic unmarking of the image.

Store Marking data 340 involves taking the modified list of coordinates and counts after the receive user input step 330. This marking data is stored in the metadata of the final modified set of images. Alternatively the information could be stored externally or in a sidecar file.

Generate final report 345 is accomplished by compiling the full set of final modified images into a single file and combining the statistics into a single, easily readable file that can be provided to a user. This file provides an audit trail for users later and diagnosis can be provided that is accurate and reviewable. This file can simply be stored on a readable media or displayed on a monitor for a user. Alternatively, the file can be uploaded to a database that is connected to the user's device.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Any of the above mentioned systems, units, modules, engines, controllers, interfaces, components or the like may be and/or comprise hardware and/or software as described herein. For example, the enterprise system 101, the query wise stateless structure engine 110, the large language model (LLM) system 120, the network 150, and subcomponents thereof may be and/or comprise computing hardware and/or software as described herein in association with FIGS. 4-7. Furthermore, any of the above mentioned systems, units, modules, engines, controllers, interfaces, components or the like may use and/or comprise an application programming interface (API) for communicating with other systems units, modules, engines, controllers, interfaces, components, or the like for obtaining and/or providing data or information.

Figure 4:
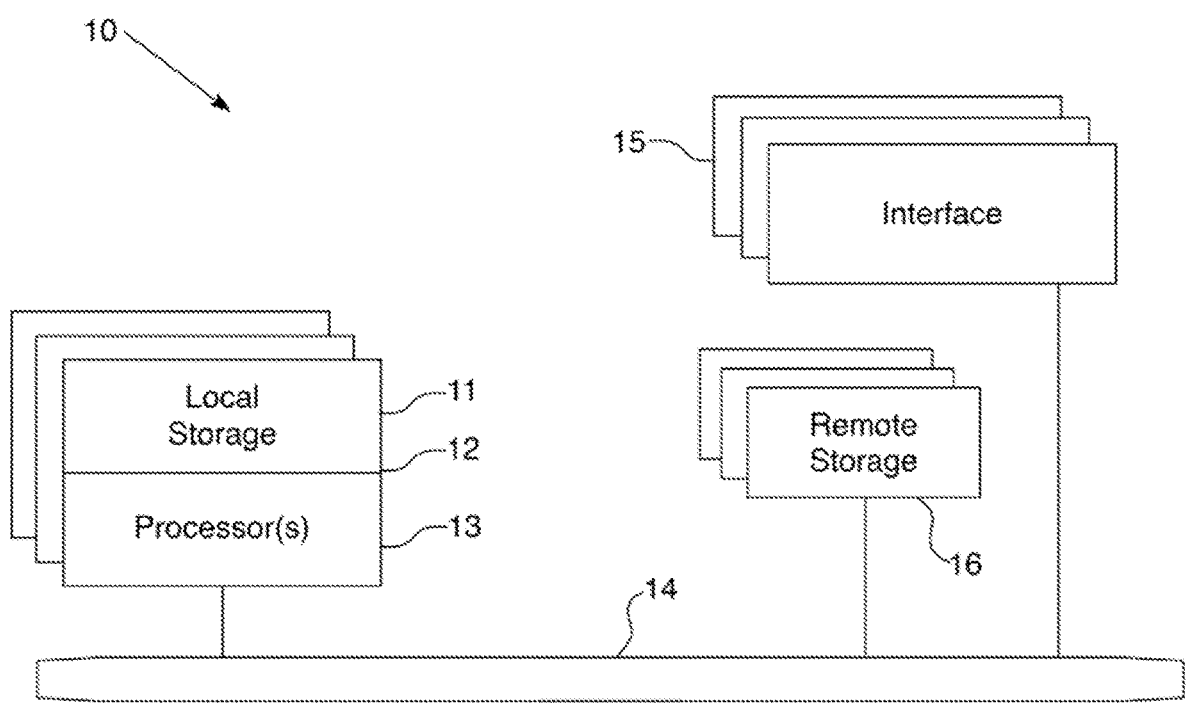

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™. THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
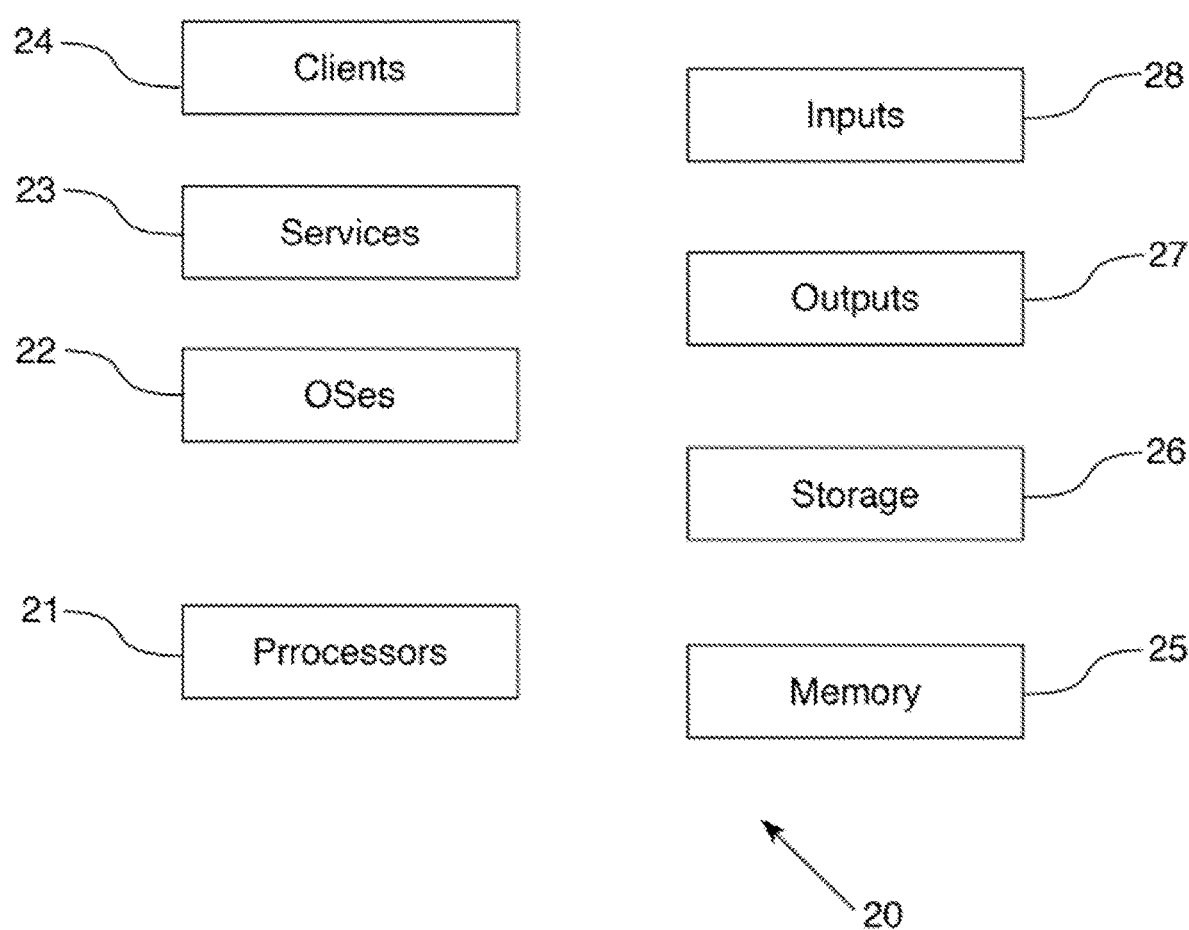
FIG. 5 illustrates components of a system architecture that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
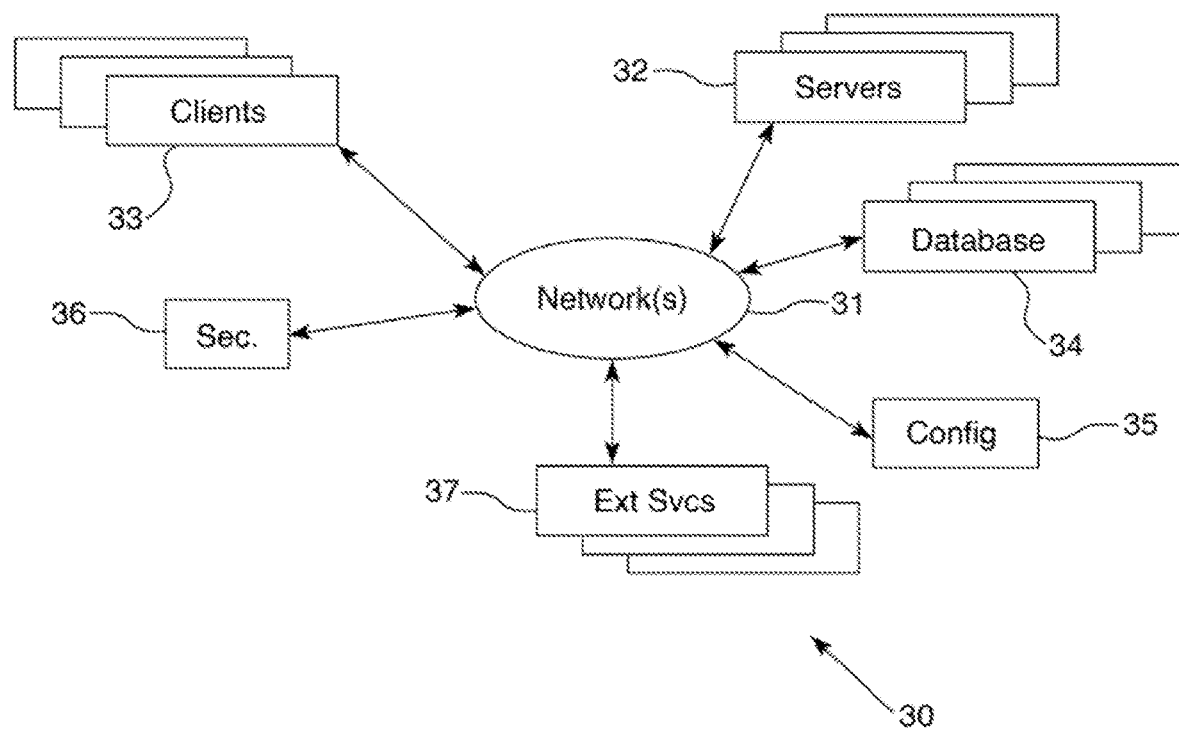
FIG. 6 illustrates components of a computing device that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
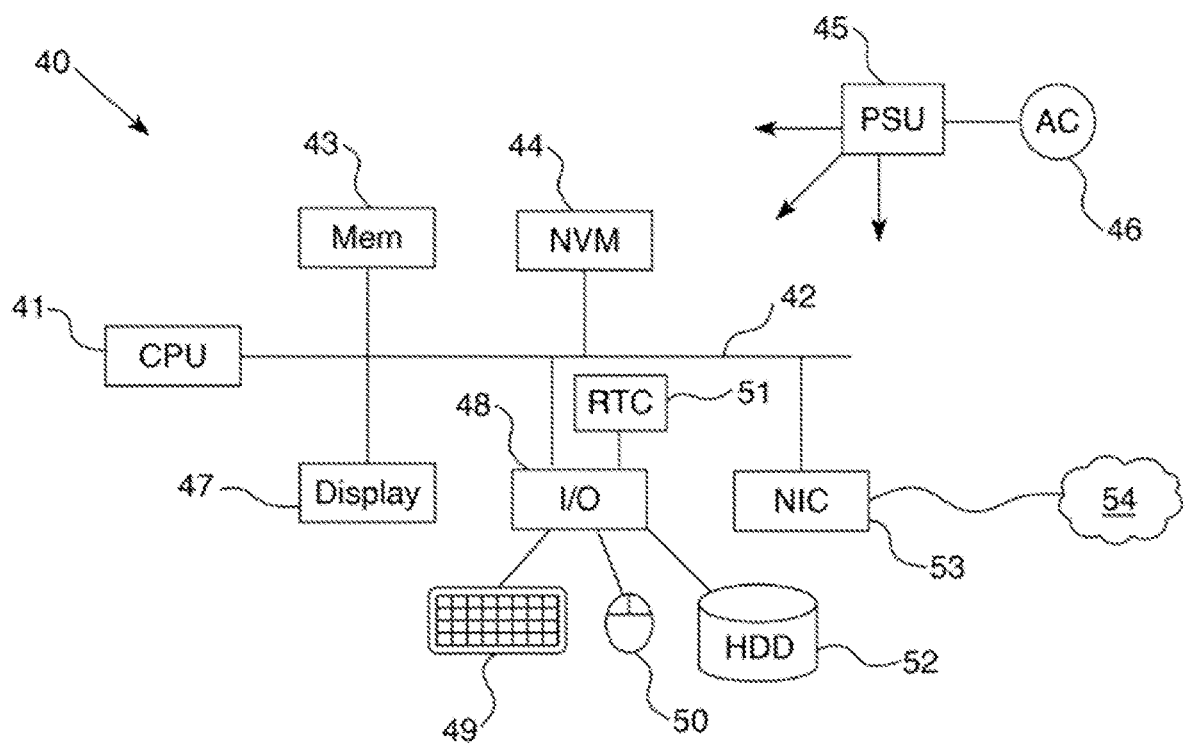
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for facilitating database queries through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer implemented method for analyzing images of cellular data, the computer implemented method comprising:
    receiving a first set of image data, the first set of image data stored on a computer readable medium wherein the first set of image data comprises at least one image, wherein the at least one image comprises a set of image metadata associated with the at least one image;
    applying an image processing algorithm to identify pixels associated with a first color and second color, wherein each color is associated with at least one cell, wherein the first color is associated with a first range of colors, and wherein the second color is associated with a second range of colors;
    associating the identified pixels with a set of coordinates which comprise at least one of a x-axis coordinate and a y-axis coordinate;
    receiving a data file comprising a plurality of status indicators, wherein each status indicator is associated with a plurality of indicator colors;
    associating each pixel identified by the first color with a first status identifier to generate a first list of coordinates, and associating each pixel identified by the second color with a second status identifier to generate a second list of coordinates;
    generating a set of positive indicators based on data from the first list of coordinates and a set of negative indicators based on data from the second list of coordinates;
    generating a second set of image data set comprising the first image data set with sets of positive and negative indicators included over the original image data and containing the first and second lists of coordinates in the image metadata;
    computing a first statistical analysis of the first and second lists of coordinates to show the percentage of cells with a first status identifier compared to the total number of cells associated with the at least one image;
    computing a second statistical analysis indicating the total number of cells with the first status identifier and cells with the second status identifier across all images in the image data and the percentage of cells with a first status identifier compared to the total number of cells across all images in the image data;
    generating a first user interface element displaying the first statistical analysis for at least one image in the second set of image data;
    generating a second user interface element displaying the second statistical analysis for all the images in the second set of image data; and
    generating a third user interface element comprising the first user interface element, the second user interface element, and at least a portion of the second set of image data, wherein the user interface elements are placed in a transferable file further being sent to a user device for display on a viewport associated with the user device.

2. The computer implemented method according to claim 1, further comprising receiving input from a user.

3. The computer implemented method according to claim 2, wherein the user input can add or subtract first status indicated cells and modify the first list of coordinates.

4. The computer implemented method according to claim 2, wherein the user input can add or subtract second status indicated cells and modify the second list of coordinates.

5. The computer implemented method according to claim 3, wherein the user input can add or subtract second status indicated cells and modify the second list of coordinates.

6. The computer implemented method according to claim 5, wherein the user input is selecting at least one pixel on an image.

7. The computer implemented method according to claim 6, wherein the addition or subtraction is done by automatically detecting the presence of a cell status identifier and comparing the color of the pixel to the first and second range of colors.

8. The computer implemented method according to claim 1, wherein the image data comprises JPEG files.

9. The computer implemented method according to claim 1, wherein the computer readable medium being on the same computer device as the one executing the computer implemented method.

10. The computer implemented method according to claim 1, wherein the computer readable medium being on a different computer device as the one executing the computer implemented method.

11. The computer implemented method according to claim 1, wherein a first range of colors indicates cancerous nuclei cells and a second range of colors indicates non-cancerous nuclei.

12. The computer implemented method according to claim 11, wherein the first statistical analysis shows the percentage of cancerous cells when compared to the total number of cells.

13. The computer implemented method according to claim 1, wherein a first and second range of colors are determined by an artificial intelligence reviewing a training set of images.

14. The computer implemented method according to claim 1, wherein a first and second range of colors are determined by receiving user color input.

15. The computer implemented method according to claim 1, wherein the users color input comprises prompting a user to indicate cancerous and non-cancerous nuclei in a training image.

16. The computer implemented method according to claim 1, wherein the transferable file is a PDF.

17. The computer implemented method according to claim 1, wherein displaying the second statistical analysis results in sharing the second set of image data, thereby creating an audit trail of the second statistical analysis which is carried over with the second set of image data.

18. A computing system for analyzing images of cellular data, the computing system comprising:
  control circuitry configured to perform a method comprising:
  receiving a first set of image data, the first set of image data stored on a computer readable medium wherein the first set of image data comprises at least one image, wherein the at least one image comprises a set of image metadata associated with the at least one image;
  applying an image processing algorithm to identify pixels associated with a first color and second color, wherein each color is associated with at least one cell, wherein the first color is associated with a first range of colors, and wherein the second color is associated with a second range of colors;
  associating the identified pixels with a set of coordinates which comprise at least one of a x-axis coordinate and a y-axis coordinate;
  receiving a data file comprising a plurality of status indicators, wherein each status indicator is associated with a plurality of indicator colors;
  associating each pixel identified by the first color with a first status identifier to generate a first list of coordinates, and associating each pixel identified by the second color with a second status identifier to generate a second list of coordinates;
  generating a set of positive indicators based on data from the first list of coordinates and a set of negative indicators based on data from the second list of coordinates;
  generating a second set of image data set comprising the first image data set with sets of positive and negative indicators included over the original image data and containing the first and second lists of coordinates in the image metadata;
  computing a first statistical analysis of the first and second lists of coordinates to show the percentage of cells with a first status identifier compared to the total number of cells associated with the at least one image;
  computing second statistical analysis indicating the total number of cells with the first status identifier and cells with the second status identifier across all images in the image data and the percentage of cells with a first status identifier compared to the total number of cells across all images in the image data;
  generating a first user interface element displaying the first statistical analysis for at least one image in the second set of image data;
  generating a second user interface element displaying the second statistical analysis for all the images in the second set of image data; and
  generating a third user interface element comprising the first user interface element, the second user interface element, and at least a portion of the second set of image data, wherein the user interface elements are placed in a transferable file further being sent to a user device for display on a viewport associated with the user device.

19. A non-transitory computer readable medium comprising instructions that when executed by a processor enable the processor to:
  receiving a first set of image data, the first set of image data stored on a computer readable medium wherein the first set of image data comprises at least one image, wherein the at least one image comprises a set of image metadata associated with the at least one image;
  applying an image processing algorithm to identify pixels associated with a first color and second color, wherein each color is associated with at least one cell, wherein the first color is associated with a first range of colors, and wherein the second color is associated with a second range of colors;
  associating the identified pixels with a set of coordinates which comprise at least one of a x-axis coordinate and a y-axis coordinate;
  receiving a data file comprising a plurality of status indicators, wherein each status indicator is associated with a plurality of indicator colors;
  associating each pixel identified by the first color with a first status identifier to generate a first list of coordinates, and associating each pixel identified by the second color with a second status identifier to generate a second list of coordinates;
  generating a set of positive indicators based on data from the first list of coordinates and a set of negative indicators based on data from the second list of coordinates;
  generating a second set of image data set comprising the first image data set with sets of positive and negative indicators included over the original image data and containing the first and second lists of coordinates in the image metadata;
  computing a first statistical analysis of the first and second lists of coordinates to show the percentage of cells with a first status identifier compared to the total number of cells associated with the at least one image;
  computing second statistical analysis indicating the total number of cells with the first status identifier and cells with the second status identifier across all images in the image data and the percentage of cells with a first status identifier compared to the total number of cells across all images in the image data;
  generating a first user interface element displaying the first statistical analysis for at least one image in the second set of image data;
  generating a second user interface element displaying the second statistical analysis for all the images in the second set of image data; and generating a third user interface element comprising the first user interface element, the second user interface element, and at least a portion of the second set of image data, wherein the user interface elements are placed in a transferable file further being sent to a user device for display on a viewport associated with the user device.

\* \* \* \* \*